Jan. 6, 1953   G. A. LYON   2,624,629
WHEEL COVER
Filed Dec. 23, 1948   2 SHEETS—SHEET 1
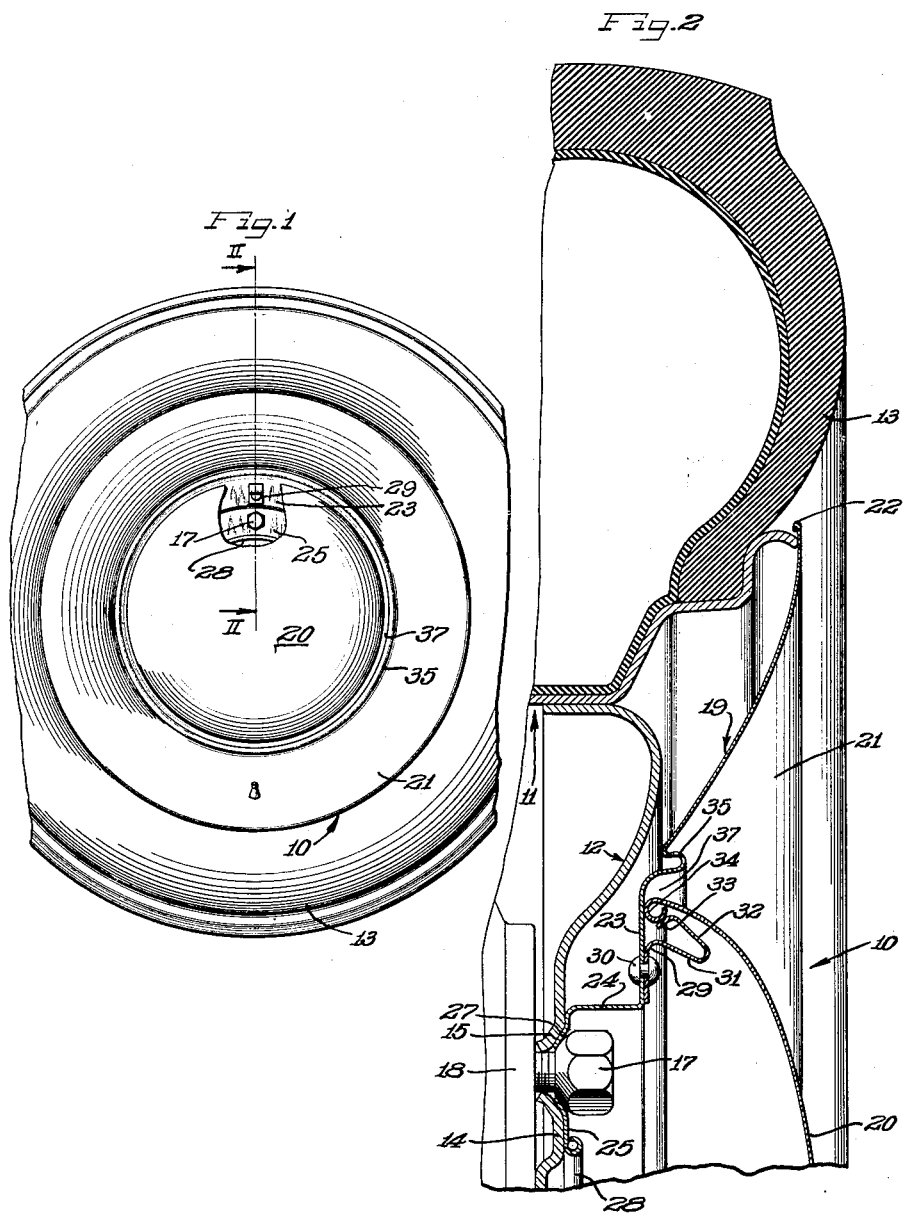
Inventor
George Albert Lyon Jan. 6, 1953 G. A. LYON 2,624,629
WHEEL COVER
Filed Dec. 23, 1948 2 SHEETS—SHEET 2

Inventor
George Albert Lyon

Patented Jan. 6, 1953

2,624,629

UNITED STATES PATENT OFFICE 2,624,629

WHEEL COVER

George Albert Lyon, Detroit, Mich.

Application December 23, 1948, Serial No. 66,930

13 Claims. (Cl. 301—37)

The present invention relates to improvements in wheel structures and more particularly to novel cover structures for ornamentally and protectively covering the outer side of vehicle wheels.

The present application is a continuation-in-part of my copending application Serial No. 571,853 filed January 8, 1945, now Patent Number 2,537,072, issued January 9, 1951.

An important object of the present invention is to provide a novel cover assembly in which one cover component carries another detachably in snap-on, pry-off relation and from which the detachable cover is adapted to be pried without damaging the outer surface finish of the carrying cover component.

Another object of the invention is to provide a composite cover assembly in which one cover member supports another in snap-on, pry-off relation and has a pry-off tool fulcrum rib which prevents marring of the surface of the carrying cover member in the application of a pry-off tool to the assembly for removing the detachable cover member.

A further object of the invention is to provide an improved wheel cover adapted to support a hub cap and having means for bolt-on attachment to the central part of the wheel body.

Still another object of the invention is to provide a composite cover structure in which one cover member is supported by another in snap-on, pry-off relation and the supporting cover member is substantially reinforced in the area thereof which is subject to pry-off tool pressure in removing the supported cover member.

In accordance with the general features of the invention, there is provided in a wheel structure including a tire rim and a supporting body part having a central dished bolt-on flange with retaining bolts for attaching the same to a part of a vehicle axle, a cover for the outer side of the wheel including an annular portion for substantially covering the tire rim and the wheel body and having a central bolt-on flange nested within and attached to the bolt-on flange of the wheel body, said cover member having a plurality of hub cap retaining elements thereon, and a hub cap supported in snap-on, pry-off relation on said cover member by said retaining elements, said cover member having an annular rib projecting from the surface thereof in radially spaced adjacency to the edge of the hub cap and protruding sufficiently from the surface of the radially outer portion of the cover member for the application of a pry-off tool for removal of the hub cap and fulcrumed on the rib in applying pry-off force to the hub cap.

According to other general features of the invention the central bolt-on portion of the cover member is normally held in spaced relation axially outwardly relative to the bolt-on flange of the wheel by reason of preliminary engagement of the radially outer extremity portion of the cover member against the tire rim, and the attachment bolts secure the cover member under tension by stressing the same axially inwardly against the bolt-on flange of the body. According to other general features of the invention there is provided in a cover for disposition at the outer side of a vehicle wheel, a pair of circular cover members, one of said cover members having means thereon for snap-on, pry-off attachment of the other cover member, said one cover member having a pry-off tool fulcrum prominence thereon adjacent to the edge of the other cover member.

Other objects, features and advantages of the present invention will be readily apparent from the following detailed description of certain preferred embodiments thereof taken in conjunction with the accompanying drawings, in which:

Figure 1 is a side elevational view of a wheel structure embodying the features of the present invention and with certain parts broken away for purposes of illustration;

Figure 2 is an enlarged radial sectional view taken substantially on the line II—II of Fig. 1;

As shown on the drawings:

Figure 3:
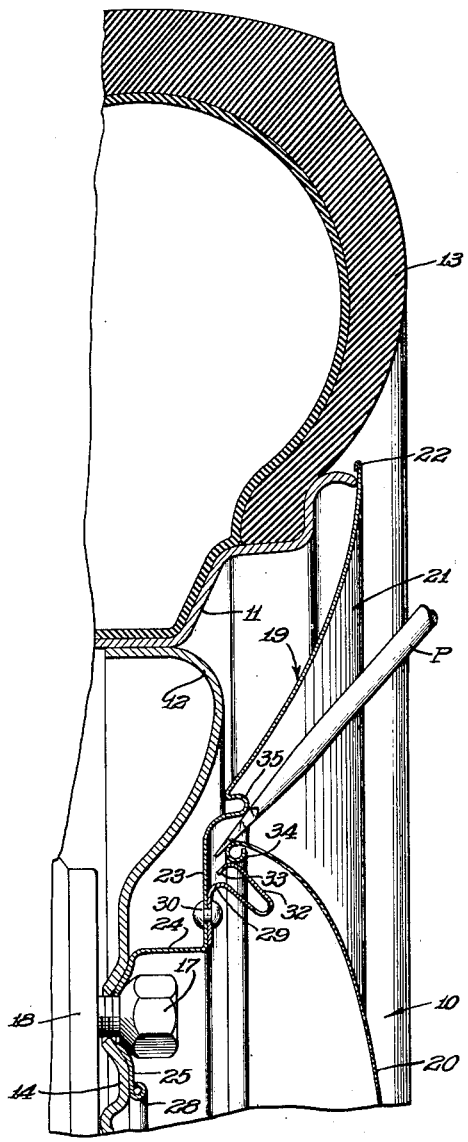
Figure 3 is a sectional view like Fig. 2 but showing how the one cover member is adapted to be removed by means of a pry-off tool applied between it and the other cover member.

A wheel cover assembly 10 according to the present invention is adapted to be applied in substantially concealing relation at the outer side of a vehicle wheel which includes a tire rim 11 and a wheel body 12. The tire rim may be of the conventional multi-flanged drop center type adapted to support a pneumatic tire and tube assembly 13. The wheel body 12 is suitably attached to the base flange of the tire rim and extends radially and axially inwardly therefrom and is provided with a central bolt-on flange 14 having bolt apertures defined by respective inwardly tapered flanges 15 for efficiently accommodating the tapered shoulders of attachment bolts 17 by which the wheel is attached to the part of a vehicle axle as identified at 18.

The cover assembly 10 is of the kind in which one cover member is attachable to the wheel and supports another cover member detachably.

Herein the cover member which is attachable to the wheel is identified at 19 while the cover member carried thereby is identified at 20.

The cover member 19 in the present instance comprises an annulus of a magnitude and extent to substantially cover the tire rim 11 and the wheel body. To this end the cover member 19 comprises a radially outer section or portion 21 which may have the outer edge reinforced as by means of an underturned curled reinforcing bead 22. From the outer marginal reinforcing bead 22 the cover section 21 extends generally radially and axially inwardly on a convex curvature which may be in general simulation of the side wall curvature of the tire 13 and may be finished in a light color, if desired, simulative of a white tire side wall so as to afford the appearance of a massive tire on the wheel having at least an inner side wall portion. On the other hand, the outer surface of the cover portion 21 may be of any other preferred finish such as a natural metallic polished surface or a plated surface.

The radially inner section or portion of the cover member 19 is preferably of generally L-shape angular form including a generally radially extending section 23 and an axially inwardly extending section 24, the latter providing a juncture or riser between the section 23 and a radially inwardly extending bolt-on flange 25 which has appropriate bolt apertures defined by tapered generally frusto-conical flanges 27 matching the bolt-on aperture flanges 15 of the wheel bolt-on flange. The inner edge of the bolt-on flange 25 may be reinforced by a curled reinforcing bead 28. The construction and arrangement of the cover 19 is preferably such that when the same is initially applied to the wheel, the outer margin thereof engages against the tire rim and holds the bolt-on flange 25 in slightly spaced relation to the bolt-on flange 14 of the wheel so that when the bolts 17 are tightened to secure the cover 19 to the wheel and the wheel to the axle part 18 of the vehicle, the cover is drawn up against the wheel under tension and is thus held firmly against rattling or displacement.

Means are provided on the inner cover section 23 for detachably retaining the hub cap cover member 20 in snap-on, pry-off relation. To this end, the inner cover member 23 serves as a hub cap receiving platform upon which are carried a series of appropriately spaced retaining clips 29 which may be secured thereto as by means of rivets 30 and are provided with generally axially and radially outwardly extending resilient cover retaining gooseneck respective portions 31 provided with outwardly facing cam flange portions 32 and terminal underturned retaining flange terminal portions 33. The construction and arrangement of the retaining clips 29 is such that the hub cap cover member 20 is mounted by applying a beaded, reinforced edge 34 thereon against the cam flange portions 32 of the clips and pressing axially inwardly against the hub cap until the bead 34 snaps behind the retaining terminal flange portions 33 of the clips which retain the bead 34 against the platform cover section 23.

In order to remove the central or hub cap cover member 20 for access to the attachment bolts 17 which, together with the central portion of the cover member 19 are concealed by the cover member 20 in the assembly, a pry-off tool P (Fig. 3) is adapted to be inserted between the hub cap bead 34 and the cover member 19 and manipulated to pry the hub cap cover member 20 free from the retaining clips 29. In effecting the pry-off of the hub cap cover member 20, the tool P must be fulcrumed against the cover member 19. In the absence of any special fulcrum means, such fulcruming would occur over a substantial radial area of the outer surface of the cover portion 21, as a consequence of the relatively large radius curvature of such cover portion and the inevitable rocking travel of the pry-off tool from adjacent to the point of engagement between the cover members in a radially outward direction as the outer end of the pry-off tool is depressed and the inner end is raised to move the edge of the inner cover member axially outwardly past the gooseneck resilient retaining heads of the retaining clips.

According to the present invention, however, means are provided which will isolate the fulcruming action of the pry-off tool to a very limited area of the surface of the supporting cover member 19 and thus save the major exposed area of the cover member 19 from pry-off tool damage. To this end, the cover member 19 is formed at the radially outer margin of the inner portion 23, and preferably at the juncture of the portions 21 and 23 with a generally axially outwardly protruding annular relatively narrow rib 35. This rib projects axially outwardly a sufficient distance beyond the adjacent outer surface plane of the cover portion 21 so that when the pry-off tool P is fulcrumed thereagainst in prying the cover member 20 free, the tool will not engage against the outer surface of the cover portion 21 throughout the range of rocking movement necessary to pry the inner cover member 20 free, and preferably even then allows for a liberal extent of overrocking of the tool P as might be experienced should the inner cover stick momentarily and then suddenly pop off with a consequent overrocking axially inward of the outer portion of the pry-off tool.

In addition, the pry-off rib 35 is preferably spaced a substantial distance radially outwardly relative to the edge of the inner cover member 20 so as to provide a liberal pry-off tool entry space 37 between the radially inner side of the rib 35 and the edge of the inner cover member 20.

Figure 4:
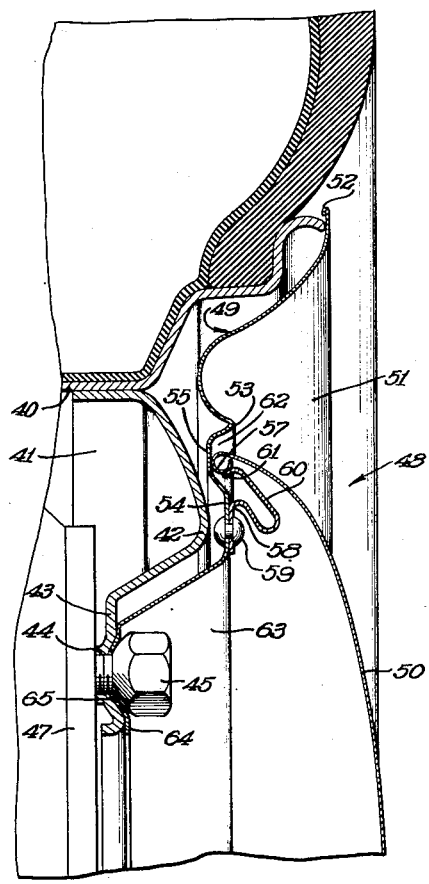
Figure 4 is a fragmentary radial sectional view through a wheel structure showing a modified form of the cover assembly.

In the modified form of Fig. 4 the wheel structure is of the kind wherein a tire rim 40 is supported by a wheel body 41 having a substantial intermediate annular axially outwardly protruding nose bulge 42 defining a dished bolt-on flange depression at the central portion of the wheel terminating in an annular inner radially inwardly extending bolt-on flange 43 having bolt apertures 44 through which attachment bolts 45 extend and attach the wheel to a vehicle axle part 47. For covering the outer side of the wheel a cover assembly 48 is provided which includes an annular cover member 49 and a central hub cap member 50 supported by the cover member 49.

The annular cover member 49 includes a radially outer annular portion 51 which is of an extent to substantially cover the tire rim 40 and has the radially outer edge reinforced as by means of an underturned beaded or crimped edge 52 from which the cover portion or section 51 extends generally radially and relatively sharply axially on a convex curvature inwardly and then curves reversely radially inwardly and axially outwardly to a relatively sharp axially outwardly protruding ridge-like rib 53. This rib provides a juncture with a generally radially inwardly extending cover section 54 formed adjacent to the rib 53 with an axially inwardly projecting annular relatively wide rib 55 defining an outwardly opening groove within which a beaded edge 57 on the central hub cap cover member 50 is received and retained by means such as cover retaining spring clips 58 of gooseneck form on the same order as the clips 29 previously described and secured to the cover portion or section 54 as by means of rivets 59. The clips 58 have cam head flanges 60 and terminal retaining flanges 61 which engage against the bead 57 of the hub cap and clamp the same into the bottom of the groove defined by the reentrant rib 55. It will be observed that the radially inner side of the rib 53 is spaced substantially from the edge of the cover 50 so as to provide a pry-off tool receiving entry space 62.

From the inner margin of the inner cover portion 54 a generally axially inwardly extending juncture or riser portion 63 extends to a generally radially inwardly extending bolt-on flange portion 64 having bolt holes 65 matching the bolt holes 44 in the wheel body. With this form of cover similarly as the cover 10, the cover member 49 is attached to the wheel under tension by drawing the inner portion thereof under resilient stress against the bolt-on flange 43 as an incident to tightening the attachment bolts 45.

From the foregoing it will be apparent that in both forms of the cover described the supporting cover annulus is arranged to be attached to the wheel as an incident to applying the wheel to the vehicle. Thereafter the hub cap cover portion is arranged to be snapped into place on the supporting cover member of the assembly and this provides an attractive complete cover for the wheel in which the central or hub cap cover member effectively conceals the attachment bolts as well as the radially inner portion of the supporting cover member and the attachment means for the hub cap. The rib on the outer cover member which encircles the edge of the hub cap serves not only as a pry-off fulcrum but also substantially reinforces the annular supporting cover member in a general sense as well as against deformation when the pry-off tool is applied thereto in prying the hub cap member free from the assembly. Inasmuch as the ridge of the pry-off rib is in each instance of quite limited area so that the pry-off tool only engages a relatively minute portion of the crest or ridge of the rib any slight tool marks or marring that may occur will be quite insignificant, whereas if the pry-off tool were permitted to fulcrum by rocking against the major exposed outer surface of the supporting cover member pry-off tool damage could be quite extensive.

Since the pry-off rib in each instance is relatively narrow, it will afford the illusion of being the edge of the terminal flange of a very small tire rim at the base of what appears as the side wall extension afforded by the cover. If desired, the ridge of the pry-off rib may be colored in a darker color to contrast with the remainder of the cover and to enhance the appearance of being the edge of a small tire rim.

I claim as my invention:

1. In a wheel structure including a tire rim and a supporting body part having a central dished bolt-on flange with retaining bolts for attaching the same to a part of a vehicle axle, a cover for the other side of the wheel including an annular portion for substantially covering the tire rim and the wheel body and having a central bolt-on flange nested within and attached to the bolt-on flange of the wheel body, said cover member having a plurality of hub cap retaining elements thereon, and a hub cap supported in snap-on, pry-off relation on said cover member by said retaining elements, said cover member having an annular rib projecting from the surface thereof in radially spaced adjacency to the edge of the hub cap and protruding sufficiently from the surface of the radially outer portion of the cover member for the application of a pry-off tool for removal of the hub cap and fulcrumed on the rib in applying pry-off force to the hub cap.

2. In a wheel structure including a tire rim and a supporting body part having a central dished bolt-on flange with retaining bolts for attaching the same to a part of a vehicle axle, a cover for the outer side of the wheel including an annular portion for substantially covering the tire rim and the wheel body and having a central bolt-on flange nested within and attached to the bolt-on flange of the wheel body, said cover member having a plurality of hub cap retaining elements thereon, and a hub cap supported in snap-on, pry-off relation on said cover member by said retaining elements, said cover member having an annular rib projecting from the surface thereof in radially spaced adjacency to the edge of the hub cap and protruding sufficiently from the surface of the radially outer portion of the cover member for the application of a pry-off tool for removal of the hub cap and fulcrumed on the rib in applying pry-off force to the hub cap, the central bolt-on portion of the cover member being normally held in spaced relation axially outwardly relative to the bolt-on flange of the wheel by reason of preliminary engagement of the radially outer extremity portion of the cover member against the tire rim, and the attachment bolts securing the cover member under tension by stressing the same axially inwardly against the bolt-on flange of the body.

3. In a wheel cover assembly, a pair of cover members one of which is supported by the other, said other cover member having means thereon for snap-on, pry-off retention of said one cover member and including a formation thereon providing a ridge in axially outwardly spaced relation to the point of engagement by said one cover member for fulcruming of a pry-off tool thereagainst to save the adjacent area from pry-off tool damage.

4. In a cover assembly for disposition at the outer side of a vehicle wheel, a supporting cover member, a supported cover member, said supporting cover member having snap-on, pry-off retention means thereon engaging and retaining said supported cover member, said supporting cover member having a pry-off tool fulcrum prominence thereon spaced radially from and projecting axially outwardly beyond the edge of the supported cover member to provide a pry-off tool entry space between the prominence and the edge of the supported cover member.

5. In combination in a vehicle wheel cover, a cover annulus having a central bolt-on flange and being of a magnitude and extent to substantially cover the tire rim and body of a wheel, said cover annulus having an inner stepped portion including a generally radially extending platform section, said platform section having a plurality of spring clips mounted thereon, and a central hub cap cover member retained in assembly by said spring clips, said cover annulus having an annular generally axially outwardly projecting rib thereon spaced radially outwardly from the edge of the hub cap member and projecting substantially axially outwardly beyond the point of engagement of the hub cap member and also projecting axially outwardly beyond the adjacent radially outer portion of the annular cover member, whereby a pry-off tool is adapted to be fulcrumed against said rib without coming into contact with the radially outer portion of the annular cover member in removing the hub cap member.

6. In combination in a vehicle wheel cover, a cover annulus having a central bolt-on flange and being of a magnitude and extent to substantially cover the tire rim and body of a wheel, said cover annulus having an inner stepped portion including a generally radially extending platform section, said platform section having a plurality of spring clips mounted thereon, and a central hub cap cover member retained in assembly by said spring clips, said cover annulus having an annular generally axially outwardly projecting rib thereon spaced radially outwardly from the edge of the hub cap member and projecting substantially axially outwardly beyond the point of engagement of the hub cap member and also projecting axially outwardly beyond the adjacent radially outer portion of the annular cover member, whereby a pry-off tool is adapted to be fulcrumed against said rib without coming into contact with the radially outer portion of the annular cover member in removing the hub cap member, said radially outer portion of the annular cover member being of generally convex cross section generally simulative of a tire side wall curvature.

7. In combination in a vehicle wheel cover, a cover annulus having a central bolt-on flange and being of a magnitude and extent to substantially cover the tire rim and body of a wheel, said cover annulus having an inner stepped portion including a generally radially extending platform section, said platform section having a plurality of spring clips mounted thereon, and a central hub cap cover member retained in assembly by said spring clips, said cover annulus having an annular generally axially outwardly projecting rib thereon spaced radially outwardly from the edge of the hub cap member and projecting substantially axially outwardly beyond the point of engagement of the hub cap member and also projecting axially outwardly beyond the adjacent radially outer portion of the annular cover member, whereby a pry-off tool is adapted to be fulcrumed against said rib without coming into contact with the radially outer portion of the annular cover member in removing the hub cap member, said radially outer portion of the annular cover member being of generally concave cross section adjacent to said rib and of generally convex cross section in the radially outermost area thereof.

8. In combination in a vehicle wheel cover, a cover annulus having a central bolt-on flange and being of a magnitude and extent to substantially cover the tire rim and body of a wheel, said cover annulus having an inner stepped portion including a generally radially extending platform section, said platform section having a plurality of spring clips mounted thereon, and a central hub cap cover member retained in assembly by said spring clips, said cover annulus having an annular generally axially outwardly projecting rib thereon spaced radially outwardly from the edge of the hub cap member and projecting substantially axially outwardly beyond the point of engagement of the hub cap member and also projecting axially outwardly beyond the adjacent radially outer portion of the annular cover member, whereby a pry-off tool is adapted to be fulcrumed against said rib without coming into contact with the radially outer portion of the annular cover member in removing the hub cap member, said annular cover member having an annular groove therein at the radially inner side of said rib receptive of the edge of the hub cap member.

9. In a wheel structure including a multi-flanged tire rim and a load sustaining body part having a generally axially outwardly protruding annular reinforcing bulge and a central generally dished bolt-on flange, and attachment bolts for securing the bolt-on flange to a portion of a vehicle axial structure, a cover assembly for the outer side of the wheel comprising an annular cover member including a radially outer tire rim covering section of generally convex cross-section substantially simulating the side wall curvature of a tire supported by the rim and an inner section including a bolt-on flange formation generally complementary to the bolt-on flange at the wheel body and attached thereto by said attachment bolts, the normal relationship of said bolt-on flange formation of said inner section being such that when the cover is initially placed against the wheel such formation remains out of engagement with the bolt-on flange of the wheel body but is drawn thereagainst under tension by the attachment bolts whereby to maintain the cover in tensioned rattle-free engagement against the wheel, and a hub cap member of a diameter to substantially cover said inner section and engage the inner section adjacent to the juncture of the inner and outer sections of the cover member, said inner section having an annular series of engagement elements thereon for detachable retaining engagement with the edge of the hub cap, a portion of one of the cover member sections extending in annular radially outwardly spaced relation to the retained edge of the hub cap and projecting substantially axially outwardly beyond said retained hub cap edge.

10. A wheel cover comprising a pair of cover members, one of said cover members being seated on the other, said other cover member having a pry-off tool fulcrum prominence in spaced adjacency to said one cover member and projecting axially outwardly beyond the point at which said one cover member is seated on said other cover member, and providing a limited tool fulcrum area.

11. In a wheel structure including a wheel assembly, a cover assembly for the outer side of the wheel assembly comprising a pair of cover members, and means for retaining the cover members in assembled relation, one of said cover members having an exposed fulcrum prominence in spaced adjacency to and projecting axially outwardly beyond the edge of the other cover member for fulcruming engagement by a pry-off tool in freeing said other cover member from the cover assembly.

12. In a wheel structure including a multi-flanged tire rim and a load sustaining body part having a generally axially outwardly protruding annular reinforcing bulge and a central generally dished bolt-on flange, and attachment bolts for securing the bolt-on flange to a portion of a vehicle axle structure, a cover assembly for the outer side of the wheel comprising an annular cover member including a radially outer tire rim covering section and an inner section including a bolt-on flange formation generally complementary to the bolt-on flange at the wheel body and attached thereto by said attachment bolts, and a hub cap member of a diameter to substantially cover said inner section and engage the inner section adjacent to the juncture of the inner and outer sections of the cover member, said inner section having an annular series of engagement elements thereon for detachable retaining engagement with the edge of the hub cap, a portion of one of the cover member sections in radially outwardly spaced relation to the retained edge of the hub cap projecting substantially axially outwardly beyond said retained hub cap edge, whereby to provide a fulcrum for receiving a pry-off tool inserted in the space between the hub cap and said portion.

13. In a cover assembly of the character described, a cover member having an annular axially outwardly opening channel therein, a second cover member having an edge formed with a reinforcing bead and receptive in said channel, the first cover member having clip means thereon for engaging said beaded edge to retain the same in said channel, the channel being wider than the beaded edge and affording a gap exposed for the reception of a pry-off tool therein for dislodging the second cover member from said clips, the side of the channel exposed at said gap comprising a portion extending generally axially outwardly and joining at a peak-like juncture with a converging angularly related portion to provide a narrow rib affording a fulcrum shoulder for the pry-off tool.

GEORGE ALBERT LYON.

REFERENCES CITED

The following references are of record in the file of this patent:

UNITED STATES PATENTS

| Number | Name | Date |
| --- | --- | --- |
| 2,166,216 | Lyon | July 18, 1939 |
| 2,368,232 | Aske | Jan. 30, 1945 |

FOREIGN PATENTS

| Number | Country | Date |
| --- | --- | --- |
| 780,637 | France | Apr. 29, 1935 |